United States Patent [19]
Guthke et al.

[11] Patent Number: 5,388,790
[45] Date of Patent: Feb. 14, 1995

[54] GUIDE AND SUPPORT FRAME FOR ELECTRICAL CONDUCTORS IN AN AIRCRAFT

[75] Inventors: Hans-Peter Guthke, Steinkirchen; Werner Piede, Jork, both of Germany

[73] Assignee: Deutsche Aerospace Airbus GmbH, Hamburg, Germany

[21] Appl. No.: 172,082

[22] Filed: Dec. 21, 1993

Related U.S. Application Data

[63] Continuation-in-part of Ser. No. 830,236, Jan. 31, 1992, abandoned.

[30] Foreign Application Priority Data

Feb. 2, 1991 [DE] Germany ............................. 4103237

[51] Int. Cl.⁶ ......................................... E21F 17/02
[52] U.S. Cl. ......................................... 248/58; 248/65
[58] Field of Search ..................... 248/58, 62, 65, 74.1, 248/49, 68.1, 554

[56] References Cited

U.S. PATENT DOCUMENTS

| | | | |
|---|---|---|---|
| 4,372,510 | 2/1983 | Skypala | 248/58 |
| 5,102,399 | 4/1992 | Chu | 248/74.1 X |
| 5,113,717 | 5/1992 | Plamper | 248/74.1 X |
| 5,332,179 | 7/1994 | Kuffel et al. | 248/68.1 X |

*Primary Examiner*—Ramon O. Ramirez
*Attorney, Agent, or Firm*—W. G. Fasse; W. F. Fasse

[57] ABSTRACT

Electrical conductors of a wiring system in an aircraft are mounted on a guide and support frame of modular structure. The frame is mounted on a structural air frame of the air-craft. Frames of different sizes may be assembled of tubular components and interlocking elements that have stubs that fit into open ends of the tubular components. The interlocking elements and the tubular components are made of electrically insulating materials such as thermoplastic materials. The stubs have wedge-shaped pockets or notches for holding an adhesive.

17 Claims, 5 Drawing Sheets

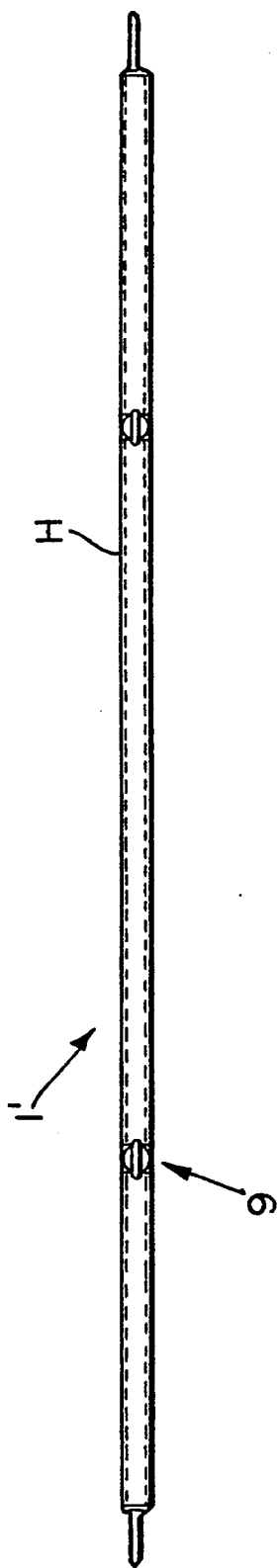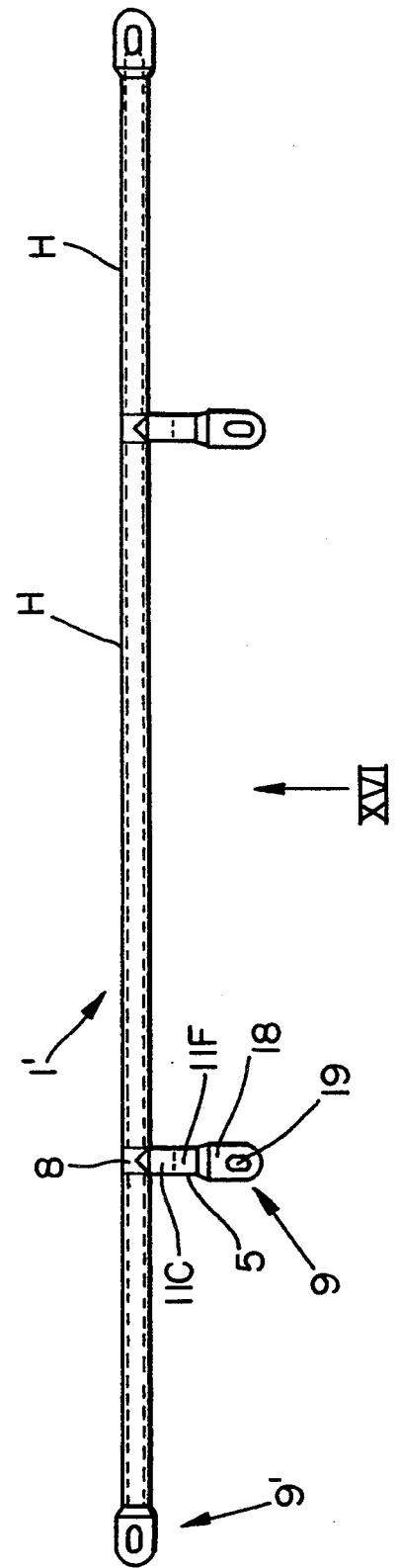

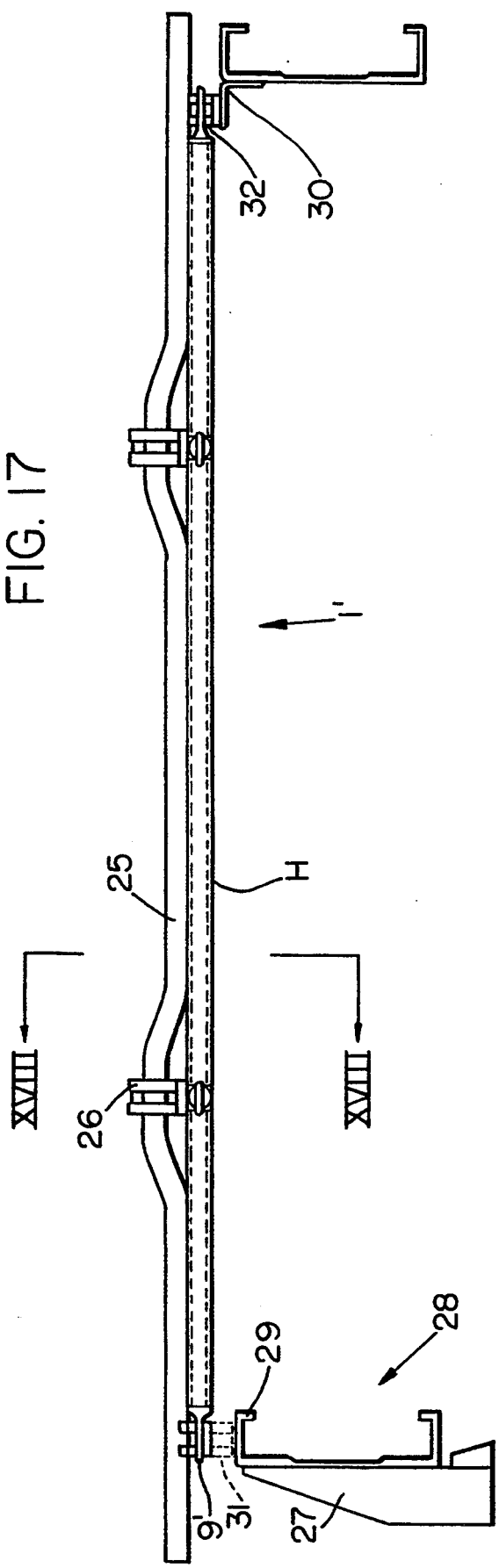

GUIDE AND SUPPORT FRAME FOR ELECTRICAL CONDUCTORS IN AN AIRCRAFT

CROSS-REFERENCE TO RELATED APPLICATION

This application is a continuation-in-part application of our commonly assigned U.S. patent application Ser. No. 07/830,236, filed Jan. 31, 1992, now abandoned. The entirety of the parent application is incorporated herein by reference.

FIELD OF THE INVENTION

The invention relates to a guide and support frame for electrical conductors forming the electrical wiring in an aircraft. The frame is assembled of tubular components interconnected at predetermined locations and has mounting components that are connectable to the aircraft structure or frame.

BACKGROUND INFORMATION

The wiring in an aircraft must be installed along predetermined paths so as not to interfere with other structural components of the aircraft. It is also necessary to keep electrical conductors of different paths separated from each other at a required spacing distance, for example, to avoid electromagnetic interferences and so-called arc tracking. Arc tracking can occur under humid conditions if the insulation of a "live" electrical conductor is damaged. In that case a creeping current may occur between two damaged conductors having a respective potential difference between them or may occur between a live conductor and a component at a ground potential.

Conventional support and guide frames of this type are constructed of aluminum tubing interconnected by welding. In order to be connected to the supporting structure, such as an aircraft frame, the ends of the tubular frame members are equipped with an insert and pressed flat and then provided with connecting bores passing through the flat portion of the tubular end. In order to effectively protect the surfaces of the tubular frames, a primer coating is applied to the metal tubing by means of a chromic acid oxidation process. The ends of the tubular elements are further protected by an epoxy resin layer while the tubular portions between the tubular ends are coated with a synthetic material layer applied by a so-called whirl sintering process, also referred to as a powder painting process. The internal surfaces of the tubular aluminum sections are protected by applying a suitable corrosion preventing coating, such as an LPS3 coating.

The just described measures for protecting the aluminum tubular sections against corrosion have the disadvantage that these measures increase the manufacturing costs of the guide and support frame. Costs are further increased by the expensive welding operations. The welding expenses in combination with the measures for protecting the surfaces of the aluminum tubing result in rather high manufacturing costs. A further disadvantage of the conventional guide and support frame is that the frame itself may contribute to the occurrence of or even participate in the above mentioned arc tracking or electromagnetic interference.

It is generally known that components made of a thermoplastic, such as a polyether-etherketone (PEEK), can be bonded by adhesives. However, it is generally necessary to improve the adhesion bond between the components made of PEEK by a pretreatment which involves using corona discharges to oxidize the surfaces to which the adhesive is to be applied prior to such application. Another method for preparing PEEK components for adhesive bonding involves treating the respective components with sulphuric acid. It is also known that adhesive bonding of this nature generally requires very thin adhesive coatings. In order to achieve such thin coatings, it is frequently necessary to perform special processing steps to mutually adapt the surfaces to be bonded to each other. Such processing steps may, for example, involve a surface smoothing after-treatment. Such methods for pretreating and smoothing the components to be adhesively bonded are relatively costly due to the relatively large effort and expense necessary for carrying out these steps.

OBJECTS OF THE INVENTION

In view of the foregoing it is the aim of the invention to achieve the following objects singly or in combination:

to construct a support and guide frame of the type described above in such a manner that welded connections and the required measures for protecting against corrosion are avoided;

to use electrically insulating material for constructing the support and guide frame, thereby providing an improved protection against arc tracking and electromagnetic interference;

to provide a particular structure of the support and guide frame, whereby the components of the frame can be interconnected by a form fit and an adhesive bond without requiring special pretreatment steps;

to substantially reduce the manufacturing costs of the support and guide frame as compared to the conventional frames made of aluminum tubing; and to reduce the weight of the support and guide frame as compared to the conventional frames.

SUMMARY OF THE INVENTION

A guide and support frame for electrical conductors in an aircraft, according to the invention, is constructed of tubular components and interlocking elements made of an electrically insulating material, such as a thermoplastic, for example, a polyether-etherketone. The interlocking elements have stubs that fit in a form-fitting manner into the open ends of the tubular components. An adhesive is additionally used to interconnect the stubs with the tubular components. Preferably, the inner cross-section of the tubercular components and the outer cross-section of the stubs are both cylindrical. Furthermore, the outer surfaces of the stubs are preferably provided with pockets, preferably of a wedge-type configuration, for receiving a suitable adhesive capable of bonding the electrically insulating parts to each other. Due to this structure, no special pretreatment for the adhesion bonding is necessary.

In addition to reducing the manufacturing costs, the invention also reduces the weight of these frames of comparable size. The costs are especially reduced by avoiding pretreatments previously necessary for adhesive bonding and avoiding welding steps previously necessary for conventional aluminum frames.

Further, arc tracking is reduced or avoided, since the elements of the frame are made of electrically insulating materials.

BRIEF DESCRIPTION OF THE DRAWINGS

In order that the invention may be clearly understood, it will now be described, by way of example, with reference to the accompanying drawings, wherein:

FIG. 15 is a front view of a simple guide and support frame according to the invention;

FIG. 16 is a view of the frame as seen in the direction of the arrow XVI in FIG. 15;

FIG. 17 is a view similar to FIG. 16, but showing the frame mounted on frame members of an aircraft and carrying a bundle of electrical conductors; and FIG. 18 is an enlarged sectional view of the conductor bundle and frame taken along line XVIII—XVIII of FIG. 17.

DETAILED DESCRIPTION OF PREFERRED EXAMPLE EMBODIMENTS AND OF THE BEST MODE OF THE INVENTION

Figure 1:
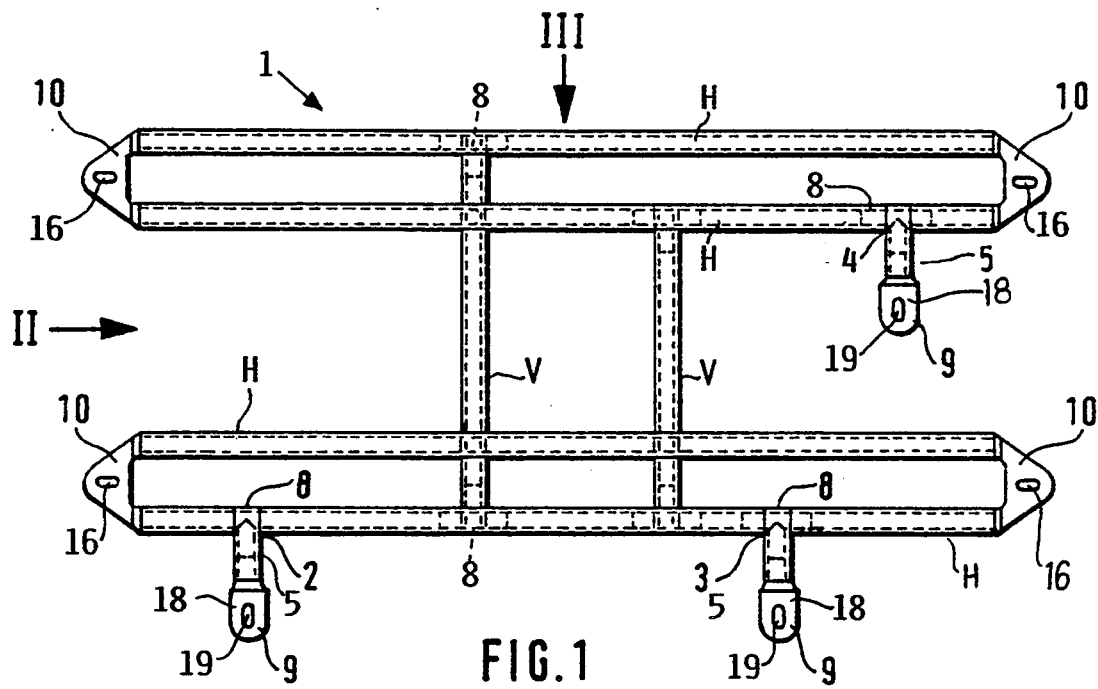
FIG. 1 is a front view of a guide and support frame according to the invention.
Figure 2:
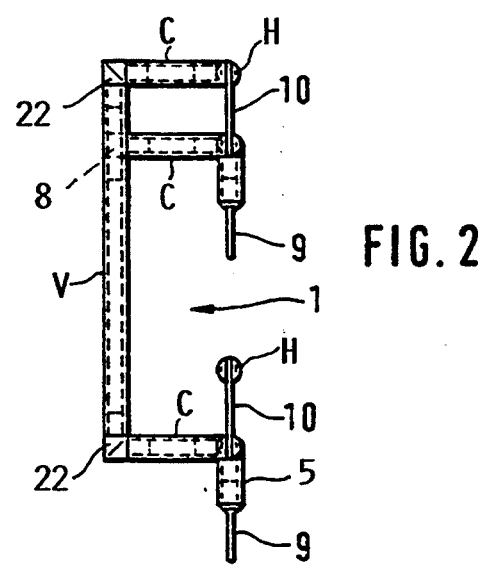
FIG. 2 is a side view of the frame as seen in the direction of the arrow II in FIG. 1.
Figure 3:
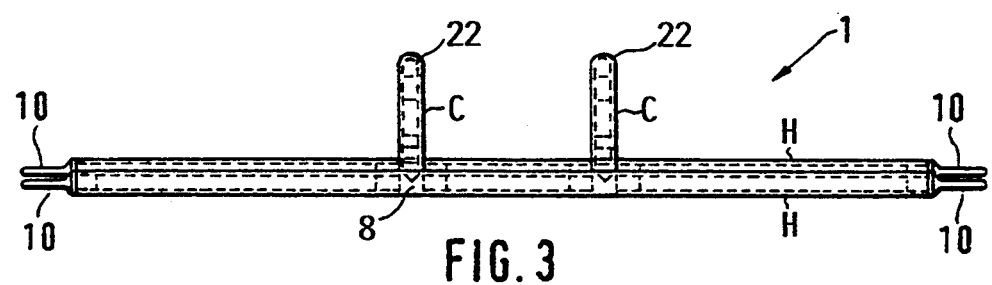
FIG. 3 is a top view of the frame as seen in the direction of the arrow III in FIG. 1.

FIGS. 1, 2, and 3 show an example embodiment of a support and guide frame 1 for electrical wiring to be used in an aircraft body. The guide frame 1 comprises a plurality of horizontal tubular components H, vertical components V, and crosswise components C. These tubular components are interconnected by interlocking or connecting elements, such as T-elements 8, bridging elements 10, and corner elements 22. The elements 8, 10, and 22 are all interlocking elements having interlocking stubs 11, preferably of cylindrical configuration to fit into open circular cross-sections at the ends of the tubular components. Although circular cross-sections at the ends of the tubes and cylindrical stubs are preferred, other matching cross-sections and configurations may be used.

Mounting members 9 are secured at locations 2, 3, and 4, for example, to the respective horizontal tubular components H by T-interlocking elements 8 and short tube components 5. A T-stub 11C (e.g. FIG. 4) fits into one end of each short tube component 5 and a stub of each mounting member 9 fits into the other end of the tube component 5. All the mating dimensions of the various parts are identical so that the just mentioned elements and members and sections fit interchangeably.

The frame 1 is secured to an aircraft body or air frame by the eye heads 18 of the mounting members 9. Mounting bolts pass through eyelets 19 of the eye heads 18 and connect to a respective mounting location on the air frame. The eyelets 19 are preferably elongated holes to facilitate the aligning and securing of the frame 1 to the aircraft structure. Only three mounting members 9 are shown. However, any required number of such mounting members may be integrated into the frame 1. The attachment or mounting of a frame 1' to an aircraft structure is shown in detail in FIG. 17 and is discussed below.

As shown in FIG. 1, four horizontally extending tubular components H are connected in pairs by four bridging interlocking elements 10. These bridging elements 10, described in greater detail below, have mounting holes 16 for securing the frame 1 to an aircraft structure not shown in FIG. 1. All tubular components, all interlocking elements, including the bridging elements, and the mounting members are made of electrically insulating materials. Preferred insulating materials are thermoplastic materials having a high material strength and a high temperature resistance. For example, polyether-etherketones (PEEK) have been found to be suitable for the present purposes. If desired, glass fibers may be embedded in the PEEK Material to further strengthen the components.

Figure 4:
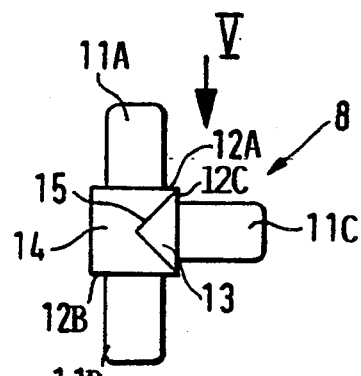
FIG. 4 is a plan view of a T-interlocking element according to the invention.
Figure 5:
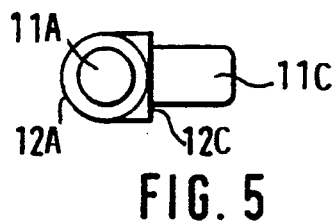
FIG. 5 is a side view of the T-interlocking element as seen in the direction of the arrow V in FIG. 4.

Referring to FIGS. 4 and 5, a T-interlocking element 8 comprises a central cylindrical section 14 with two interlocking stubs 11A and 11B extending in axial alignment with the central section 14. A further interlocking stub 11C extends at a right angle to the longitudinal axis of the stubs 11A and 11B out of a cylindrical stem portion 13 of the central section 14. The stem portion 13 and the central section 14 interface at 15. The stubs 11A, 11B and 11C have a smaller diameter than the central section 14 and the stem portion 13, thereby forming shoulders 12A, 12B and 12C. The outer diameter of the shoulders 12 corresponds to the outer diameter of the tubular components. The interface 15 where the stem portion 13 merges into the central section 14 assures a smooth transition between the outer surfaces of the tubular components and the interlocking elements when the components are properly assembled to seat smoothly against shoulders 12.

Figure 6:
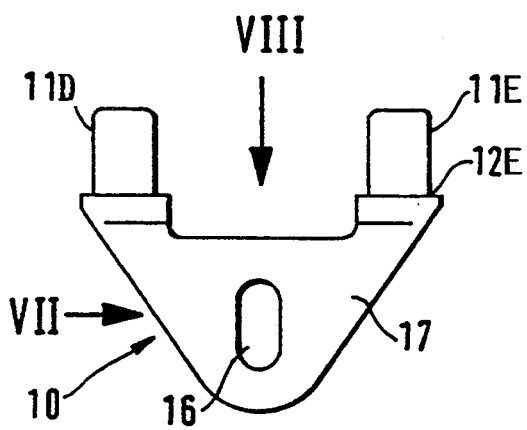
FIG. 6 is a plan view of a bridge-type interlocking element for connecting two tubular components in parallel to each other.
Figure 7:
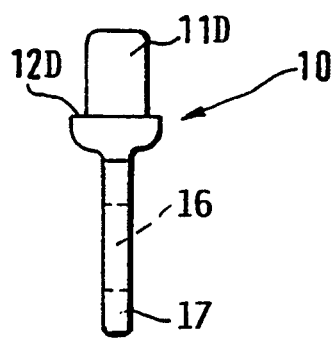
FIG. 7 is a side view of the bridge interlocking element as seen in the direction of the arrow VII in FIG. 6.
Figure 8:
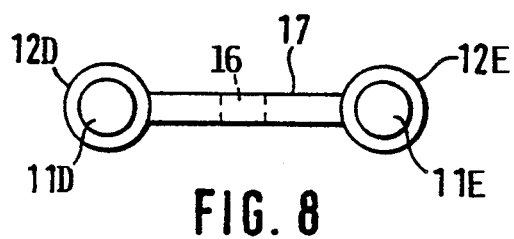
FIG. 8 is an end view of the bridging interlocking element as seen in the direction of the arrow VIII in FIG. 6.
Figure 12:
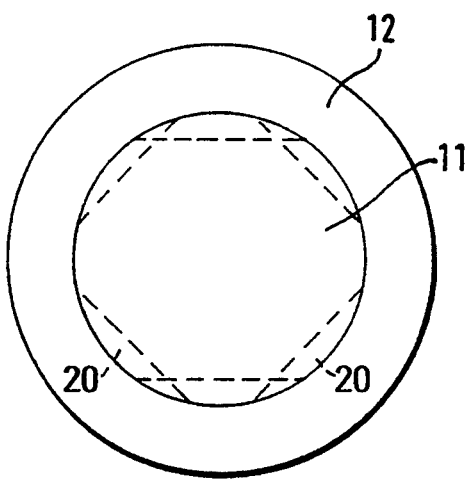
FIG. 12 is an end view of the stub in the direction of the arrow XII in FIG. 11.

FIGS. 6, 7 and 8 show the construction of the bridging interlocking elements 10. A bridging section 17 with an elongated mounting hole 16 interconnects two stubs 11D and 11E, whereby shoulders 12D and 12E are similarly formed between the bridging portion 17 and the stubs 11D and 11E. The shoulders 12D and 12E also have an outer diameter corresponding to the outer diameter of the tubular components to form a smooth transition.

Figure 9:
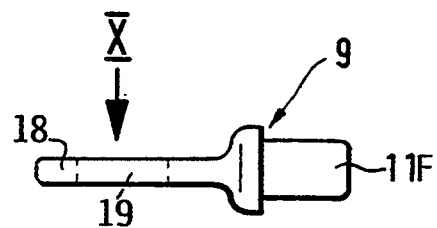
FIG. 9 is a side view of a mounting member for securing the present frame to the body of an aircraft.
Figure 10:
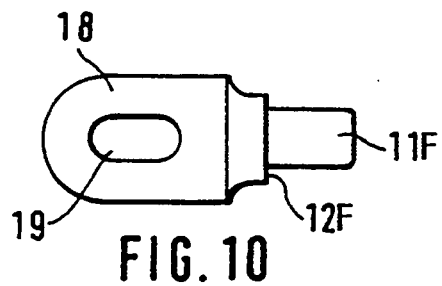
FIG. 10 is a plan view of the mounting member as seen in the direction of the arrow X in FIG. 9.

FIGS. 9 and 10 illustrate the construction of a mounting member 9 having an eye head 18 with an eyelet 19 in the form of an elongated hole for connection to an aircraft body. A shoulder 12F is formed around an interlocking stub 11F. A tube component 5 (FIG. 1) is not shown in FIGS. 9 and 10.

The above mentioned corner interlocking elements 22 shown in FIG. 2 are substantially similar to the T-element 8 shown in FIG. 4, except that the T-element 8 has an additional stub 11A while the corner element 22 only has stubs 11B and 11C, for example. Other types or configurations of interlocking elements can be made similar to the ones shown here, for example, further stubs can extend out of the central section perpendicularly or at other angles with respect to the stubs shown. Instead of the bridging element 10, bow-shaped bridging elements may be provided. Such various elements in connection with tubular components of different lengths make it possible to assemble frames 1 of any desired size and configuration. In all such frames, the stubs 11, 11A, 11B, 11C, etc. engage the respective internal tubular cross-section in a form-fitting manner, which is reinforced by an adhesive bond of a suitable adhesive capable of bonding the insulating materials such as thermoplastic materials. All the connecting or interlocking elements are preferably produced by conventional injection molding methods.

Figure 14:
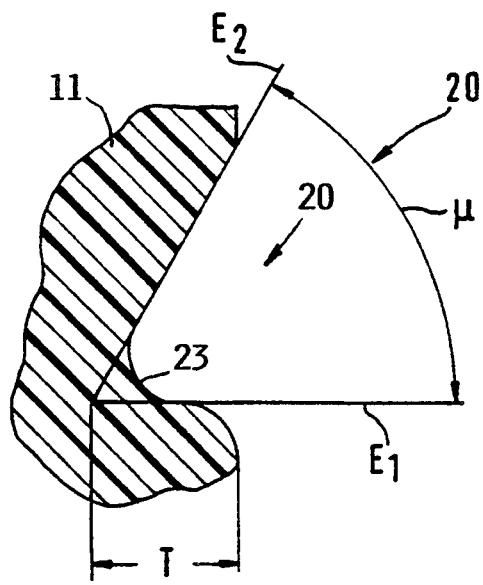
FIG. 14 is a detailed view of the area XIV in FIG. 13 to illustrate the pocket construction for holding an adhesive.
Figure 11:
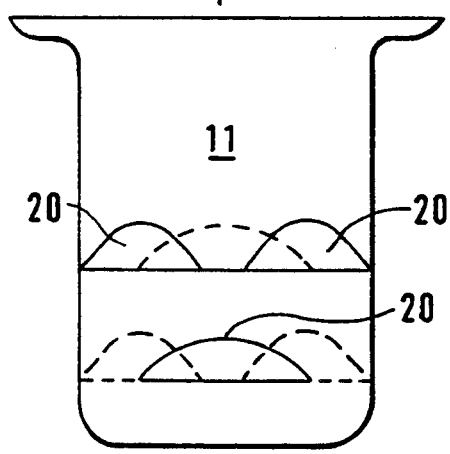
FIG. 11 is an enlarged side view of a stub of an interlocking element showing wedge-shaped pockets on the surface of the stub.
Figure 13:
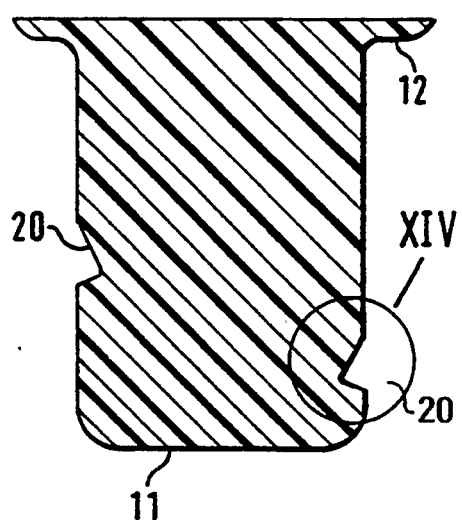
FIG. 13 is an axial sectional view of the stub along section line XIII—XIII in FIG. 11.

FIGS. 11, 12, 13, and 14 show the construction details of any one of the interlocking stubs 11. For example, six wedge-shaped notches or pockets 20 are distributed in the outer cylindrical surface of the stub 11. FIG. 13 shows two of the pockets 20 in cross-section. Details of these pockets 20 are shown in FIG. 14.

Each pocket is formed by two surface sections E1 and E2 slanted relative to each other to enclose an opening angle $\mu$ of preferably 60° as shown in FIG. 14. Preferably, the surface section E1 closer to the free end of the respective stub 11 extends substantially perpendicularly to the longitudinal central axis of the stub 11, while the second surface section E2 slants relative to the central axis at an angle of 30°, for example. The pocket or rather the surface sections $E_1$ and $E_2$ forming the pocket 20 intersect within the stub 11 at a maximum radial depth T as shown in FIG. 14. Viewing FIGS. 13 and 14 in conjunction, the actual pocket depth in this embodiment is largest toward a free end of the stub 11. The depth diminishes away from the free stub end. In order to reduce any notching effect, a fillet 23 is formed in the bottom of each wedge-shaped pocket 20.

In order to avoid the need of pretreating the parts of the frame to improve the adhesive bonding, according to the invention, the interlocking stubs 11, 11A, 11B, 11C, etc. are provided with the wedge-shaped pockets 20 which instead of relying exclusively on adhesion, provide a connection in a form-fitting manner. With regard to the tubular components, the form-fitting fit is assured in that the inner surfaces of the components can easily be made to have a slightly wavy or uneven surface or a lip at the cut end of the component during the manufacture of these tubular components. When the adhesive is applied, care must be taken that the wedge-shaped pockets 20 are completely filled with the adhesive, whereby the above-mentioned wedge shape of the pockets 20 makes sure that the adhesive is squeezed between the stubs 11 and the tubular components. The frame 1 is assembled in an adhesive bonding jig which holds the tubular components and the inter-locking and mounting elements in a proper position until the adhesive has been cured. A suitable adhesive for the present purposes is an adhesive known under the tradename Hysol EA 934 NA A+B which is an epoxy based reaction adhesive.

After the tubular components and the mounting and interlocking elements have been assembled in the jig, the entire frame and jig are placed in a drying oven where the adhesive is cured at a temperature of about 50° C. for about 150 minutes.

The strength of the adhesive bonds was tested in tensile stress tests applied to respective samples and was found to exceed strength requirements. It was found that a surprisingly advantageous bonding effect is achieved because the adhesive has an advantageous flow characteristic, which causes a wedging action that opposes the withdrawal of an interlocking stub 11 out of a respective tubular component. This effect is caused by the wedge-shaped pockets 20 holding the adhesive. It has been found that, when using the above mentioned adhesive, the wedging effect is most advantageous if the bonding gap has a thickness within the range of 0.025 to 0.35 mm.

To increase the material strength of the above-mentioned thermoplastic materials, it is advantageous to admix 30 wt. % of glass fibers into these materials to form a composite.

Another advantage of the frame according to the invention is that it is lighter in weight and substantially less expensive to manufacture than corresponding frames of aluminum tubing. This reduction in expenses is due to avoiding the expensive pretreatment for achieving the desired bonding, among other factors.

FIGS. 15 and 16 show a simple frame 1', according to the invention, which is substantially made up of horizontal tubular components H. The respective horizontal components H are interconnected by T-shaped interconnecting elements 8 like those shown and described with reference to FIG. 4. A mounting member 9 like the one shown in FIG. 9 is mounted on the protruding stub 11C of the T-shaped element 8. The mounting member 9 includes a tube component 5 connected by a stub 11F to an eye head 18 having an elongated eyelet 19 therethrough. A mounting member 9' is inserted directly into each respective free end of the frame 1', that is to say, into the respective free end of the horizontal components H.

FIG. 17 shows the frame 1' in a view similar to that of FIG. 16. In FIG. 17, the frame 1' carries a conductor or cable bundle 25 by means of cable clamps 26. The cable clamps 26 are respectively attached to a mounting member 9 as shown in FIG. 18 and described in greater detail below. Thus, it should be noted that the mounting members 9 may serve both to mount the frame 1, 1' to an aircraft structure or alternatively to mount a cable bundle 25 onto the frame 1, 1'.

The frame 1' as shown in FIG. 17 is mounted by means of mounting members 9' at its ends onto an aircraft structure such as an air frame 28. The air frame 28 may, for example, comprise C-section beams 29 as well as other structural components 27. Each mounting member 9' is secured to the air frame 28, for example, by means of an angle bracket 30 or a spacer or bushing 31. In either case, a fastener, such as a bolt or rivet which is not shown in detail, passes through the eyelet 19 to secure the mounting member 9' to the air frame 28. Additionally, a clamping element 32 may be provided for securely holding each mounting member 9'.

FIG. 18 shows an enlarged sectional view of the frame 1' carrying a cable bundle 25. The frame 1' comprises a horizontal tubular component H of which sections are joined together by a T-shaped element 8 having a stub 11A in the end of horizontal component H and a stub 11C protruding perpendicularly therefrom. A tube component 5 is attached onto the stub 11C and a stub 11F of the mounting member 9 is inserted into the opposite end of tube component 5. A fastener 35, such as a bolt, passes through the eyelet 19 of the mounting member 9 to secure a cable clamp 26 onto the mounting member 9. The cable clamp 26 is a substantially circular clamp strap with flattened securing lugs 36 extending therefrom. The bolt 35 passes through respective holes in the securing lugs 36. It should be noted that the cable clamp 26 may have one or two clamping straps or may have some other configuration as desired. A bushing 37 is arranged between the securing lugs 36 and the eye head 18 of the mounting member 9. A washer 38 backs up the nut of the bolt 35.

The cable bundle 25 may be a single insulated conductor or may, for example, be a bundle of individual insulated conductors or wires as shown in FIG. 18. The cable bundle 25 as shown includes an outer sheath or cablewrap 39 around a plurality of individual insulated wires 40.

Although the invention has been described with reference to specific example embodiments, it will be appreciated that it is intended to cover all modifications and equivalents within the scope of the appended claims.

What we claim is:

1. An aircraft wiring arrangement for carrying electrical conductors in an aircraft, the arrangement comprising an aircraft structural member, a plurality of tubular frame components made of electrically insulating material and having hollow end portions with an internal cross-sectional configuration, an interlocking element made of electrically insulating material and having a plurality of stubs each having an outer surface with an external cross-sectional configuration corresponding to said internal cross-sectional configuration, a mounting component having a stub with said external cross-sectional configuration and a conductor carrying component having a stub with said external cross-sectional configuration, wherein said interlocking element stubs are inserted in a form-fitting manner into said hollow end portions for joining together said frame components, and wherein said mounting component is attached to said structural member and said mounting component stub is inserted in a form-fitting manner into one of said hollow end portions for mounting said frame components on said structural member, and wherein said conductor carrying component stub is inserted in a form-fitting manner into one of said hollow end portions.

2. The wiring arrangement of claim 1, wherein at least one of said stubs is a notched stub having an outer surface comprising a plurality of notched pockets.

3. The wiring arrangement of claim 2, wherein said notched pockets each comprise a first notch surface and a second notch surface enclosing an angle therebetween to form a wedge-shaped pocket.

4. The wiring arrangement of claim 3, wherein said first notch surface is nearer a free end of said notched stub and extends substantially perpendicularly to a longitudinal axis of said notched stub, and wherein said second notch surface extends at said angle relative to said first notch surface.

5. The wiring arrangement of claim 3, wherein said angle is about 60°.

6. The wiring arrangement of claim 2, further comprising an adhesive applied between said notched stub and a respective one of said hollow end portions.

7. The wiring arrangement of claim 1, further comprising an adhesive applied between at least one of said stubs and a respective one of said hollow end portions.

8. The wiring arrangement of claim 1, wherein all of said stubs have a substantially cylindrical shape, and said hollow end portions have a substantially circular cross-section corresponding with said substantially cylindrical shape.

9. The wiring arrangement of claim 1, wherein said electrically insulating material comprises a thermoplastic.

10. The wiring arrangement of claim 9, wherein said thermoplastic is a polyether-etherketone.

11. The wiring arrangement of claim 9, wherein said electrically insulating material further comprises glass fibers.

12. The wiring arrangement of claim 11, wherein said glass fibers make up about 30 wt. % of said electrically insulating material.

13. The wiring arrangement of claim 4, wherein said electrically insulating material comprises a polyether-etherketone.

14. The wiring arrangement of claim 7, wherein said adhesive is an epoxy based reaction adhesive.

15. The wiring arrangement of claim 7, wherein a bond gap for receiving said adhesive is formed between said stub and said hollow end portion and is in the range of 0.025 mm to 0.35 mm.

16. The wiring arrangement of claim 1, wherein said mounting component comprises an eye head having an eyelet therethrough, and further comprising a mounting fastener passing through said eyelet for said attaching said mounting component to said structural member.

17. An aircraft wiring harness system comprising the wiring arrangement of claim 1, and a wiring harness, wherein the wiring harness comprises a cable bundle carried by said conductor carrying component.

* * * * *